United States Patent
Jia et al.

(10) Patent No.: US 10,724,755 B2
(45) Date of Patent: Jul. 28, 2020

(54) CONTROLLING RAPID WORKING MODE OF AN AIR CONDITIONER COUPLED WITH A SMART SOCKET

(71) Applicant: Beijing Xiaomi Mobile Software Co., Ltd., Beijing (CN)

(72) Inventors: Weiguang Jia, Beijing (CN); Qiang Fu, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 178 days.

(21) Appl. No.: 15/869,407

(22) Filed: Jan. 12, 2018

(65) Prior Publication Data
US 2018/0245813 A1 Aug. 30, 2018

(30) Foreign Application Priority Data
Feb. 27, 2017 (CN) .......................... 2017 1 0108833

(51) Int. Cl.
*F24F 11/48* (2018.01)
*F24F 11/65* (2018.01)
(Continued)

(52) U.S. Cl.
CPC ............ *F24F 11/48* (2018.01); *F24F 11/523* (2018.01); *F24F 11/57* (2018.01); *F24F 11/61* (2018.01);
(Continued)

(58) Field of Classification Search
None
See application file for complete search history.

(56) References Cited

U.S. PATENT DOCUMENTS

| 6,782,706 B2 * | 8/2004 | Holmes .................. F25D 29/00 62/127 |
| 2007/0021872 A1 * | 1/2007 | Fisher ................ G05D 23/1934 700/277 |

(Continued)

FOREIGN PATENT DOCUMENTS

| CN | 102788405 A | 11/2012 |
| CN | 203501385 U | 3/2014 |

(Continued)

OTHER PUBLICATIONS

Supplementary European Search Report in European application No. 18156866.8, dated Oct. 24, 2018, 7 pages.

(Continued)

*Primary Examiner* — Santosh R Poudel
(74) *Attorney, Agent, or Firm* — Arch & Lake LLP

(57) ABSTRACT

Methods and devices are provided for controlling an air conditioner in the technical field of smart home. The method includes that: a turning-on remote control signal sent by a smart socket is received, wherein the turning-on remote control signal is a signal generated and sent by the smart socket determining that an air conditioner is turned on, and the turning-on remote control signal contains an identifier of the smart socket. The smart socket may determine whether a rapid working mode of the air conditioner is enabled or not according to the identifier of the smart socket. When the rapid working mode of the air conditioner is enabled, a first remote control signal is sent to the smart socket, the first remote control signal being configured to instruct the smart socket to control the air conditioner to run with a working parameter of the rapid working mode.

13 Claims, 11 Drawing Sheets

(51) Int. Cl.
*F24F 11/57* (2018.01)
*F24F 11/61* (2018.01)
*F24F 11/70* (2018.01)
*F24F 11/523* (2018.01)
*F24F 11/63* (2018.01)
*F24F 11/64* (2018.01)
*G05B 19/042* (2006.01)
*F24F 110/00* (2018.01)
*F24F 11/58* (2018.01)
*F24F 120/20* (2018.01)
*F24F 140/50* (2018.01)

(52) U.S. Cl.
CPC .............. *F24F 11/63* (2018.01); *F24F 11/64* (2018.01); *F24F 11/65* (2018.01); *F24F 11/70* (2018.01); *G05B 19/042* (2013.01); *F24F 11/58* (2018.01); *F24F 2110/00* (2018.01); *F24F 2120/20* (2018.01); *F24F 2140/50* (2018.01); *G05B 2219/2614* (2013.01)

(56) References Cited

U.S. PATENT DOCUMENTS

| | | | | |
|---|---|---|---|---|
| 2010/0013308 A1* | 1/2010 | Lathrop | ............... | H02J 3/14 307/64 |
| 2012/0187201 A1* | 7/2012 | Kawai | ............... | F24F 11/30 236/51 |
| 2012/0310418 A1* | 12/2012 | Harrod | ............... | G05B 19/042 700/276 |
| 2015/0134139 A1* | 5/2015 | Westergaard | ............. | H02J 3/14 700/295 |
| 2016/0178225 A1 | 6/2016 | Vallikannu | | |
| 2016/0201934 A1 | 7/2016 | Hester | | |
| 2016/0202674 A1 | 7/2016 | Li | | |
| 2017/0155526 A1* | 6/2017 | Li | ............... | H01R 13/6675 |
| 2018/0209668 A1* | 7/2018 | Ha | ............... | F24F 1/0003 |

FOREIGN PATENT DOCUMENTS

| | | | | |
|---|---|---|---|---|
| CN | 204478389 U | | 7/2015 | |
| CN | 204880542 U | | 12/2015 | |
| CN | 205081314 U | | 3/2016 | |
| CN | 105467874 A | * | 4/2016 | ......... H01R 13/6683 |
| JP | 2006214600 A | * | 8/2006 | |
| KR | 100717344 B1 | | 5/2007 | |
| WO | 2016011808 A1 | | 1/2016 | |

OTHER PUBLICATIONS

Notification of the First Office Action of Chinese Application No. 201710108833.3, dated Dec. 27, 2018 (including English translation), 11 pages.

* cited by examiner

CONTROLLING RAPID WORKING MODE OF AN AIR CONDITIONER COUPLED WITH A SMART SOCKET

CROSS-REFERENCE TO RELATED APPLICATION

This application is filed based upon and claims priority to Chinese Patent Application of International Application No. 201710108833.3, filed on Feb. 27, 2017, the entire contents of which are incorporated herein by reference.

TECHNICAL FIELD

Embodiments of the present disclosure generally relate to the technical field of smart home, and more particularly, to an air conditioner control method and device.

BACKGROUND

At present, an air conditioner has cooling and heating functions, as well as a rapid cooling function and/or a rapid heating function. The rapid cooling function refers to a function of reducing a room temperature to a preset temperature by the air conditioner within a preset time period, and the preset time period is usually short, for example, 1 minute. And the rapid heating function refers to a function of increasing the room temperature to a preset temperature by the air conditioner within a preset time period, and the preset time period is also short, for example, 3 minutes. A user may control the rapid cooling function and/or rapid heating function of the air conditioner through a control terminal such as a mobile phone and a remote controller.

For example, in the case that the rapid cooling function of the air conditioner is controlled through the control terminal, when the user desires to enable the rapid cooling function of the air conditioner, an enabling signal is sent to the air conditioner through the control terminal, and the air conditioner reduces the room temperature to the preset temperature within the preset time period through a rapid cooling working parameter according to the received enabling signal, and keeps the rapid cooling working parameter unchanged. When the user desires to disable the rapid cooling function of the air conditioner, a disabling signal is sent to the air conditioner through the control terminal, and the air conditioner regulates the rapid cooling working parameter into an original working parameter according to the received disabling signal.

SUMMARY

A first aspect provides an air conditioner control method, which may include that: a turning-on remote control signal sent by a smart socket through a built-in signal sending component is received, wherein the turning-on remote control signal may be a signal generated and sent by the smart socket after a built-in signal receiving component or power statistic component determines that an air conditioner is turned on, the turning-on remote control signal may contain an identifier of the smart socket, and a plug of the air conditioner may have been plugged into the smart socket; whether a rapid working mode of the air conditioner is in an enabled state or not is queried according to the identifier of the smart socket, the rapid working mode being a turning-on rapid cooling mode or a turning-on rapid heating mode; and if the rapid working mode of the air conditioner is in the enabled state, a first remote control signal is sent to the smart socket, the first remote control signal being configured to instruct the smart socket to control the air conditioner to run with a working parameter of the rapid working mode when receiving the first remote control signal through the signal receiving component.

A second aspect provides an air conditioner control method, which may include that: when it is determined, through a built-in signal receiving component or power statistic component, that an air conditioner is turned on, a turning-on remote control signal is sent to a server through a built-in signal sending component, wherein the turning-on remote control signal may contain an identifier of a smart socket, the turning-on remote control signal may be configured to trigger the server to query whether a rapid working mode of the air conditioner is in an enabled state or not according to the identifier, the rapid working mode may be a turning-on rapid cooling mode or a turning-on rapid heating mode, and a plug of the air conditioner may have been plugged into the smart socket; a first remote control signal sent by the server is received through the signal receiving component, the first remote control signal being sent when the server finds that the rapid working mode of the air conditioner is in the enabled state; and the air conditioner is controlled to run with a working parameter of the rapid working mode according to the first remote control signal.

A fifth aspect provides an air conditioner control device, which may include: a processor and a memory configured to store an instruction executable by the processor. The processor may be configured to: receive a turning-on remote control signal sent by a smart socket through a built-in signal sending component, wherein the turning-on remote control signal may be a signal generated and sent by the smart socket after a built-in signal receiving component or power statistic component determines that an air conditioner is turned on, the turning-on remote control signal may contain an identifier of the smart socket, and a plug of the air conditioner may have been plugged into the smart socket; query whether a rapid working mode of the air conditioner is in an enabled state or not according to the identifier of the smart socket, the rapid working mode being a turning-on rapid cooling mode or a turning-on rapid heating mode; and if the rapid working mode of the air conditioner is in the enabled state, send a first remote control signal to the smart socket, the first remote control signal being configured to instruct the smart socket to control, when receiving the first remote control signal through the signal receiving component, the air conditioner to run with a working parameter of the rapid working mode.

A sixth aspect provides an air conditioner control device, which may include a processor and a memory configured to store an instruction executable by the processor. The processor may be configured to: when it is determined, through a built-in signal receiving component or power statistic component, that an air conditioner is turned on, send, through a built-in signal sending component, a turning-on remote control signal to a server, wherein the turning-on remote control signal may contain an identifier of a smart socket, the turning-on remote control signal may be configured to trigger the server to query whether a rapid working mode of the air conditioner is in an enabled state or not according to the identifier, the rapid working mode may be a turning-on rapid cooling mode or a turning-on rapid heating mode, and a plug of the air conditioner may have been plugged into the smart socket; receive, through the signal receiving component, a first remote control signal sent by the server, the first remote control signal being sent when the server finds that the rapid working mode of the air conditioner is in the enabled state; and control the air conditioner to run with a working parameter of the rapid working mode according to the first remote control signal.

BRIEF DESCRIPTION OF THE DRAWINGS

In order to describe the technical solutions in the embodiments of the present disclosure more clearly, the accompanying drawings required to be used in the descriptions about the embodiments will be simply introduced below. Obviously, the accompanying drawings described below are only some embodiments of the present disclosure, and for those skilled in the art, other accompanying drawings may also be obtained without creative work according to these accompanying drawings.

DETAILED DESCRIPTION

Figure 1:
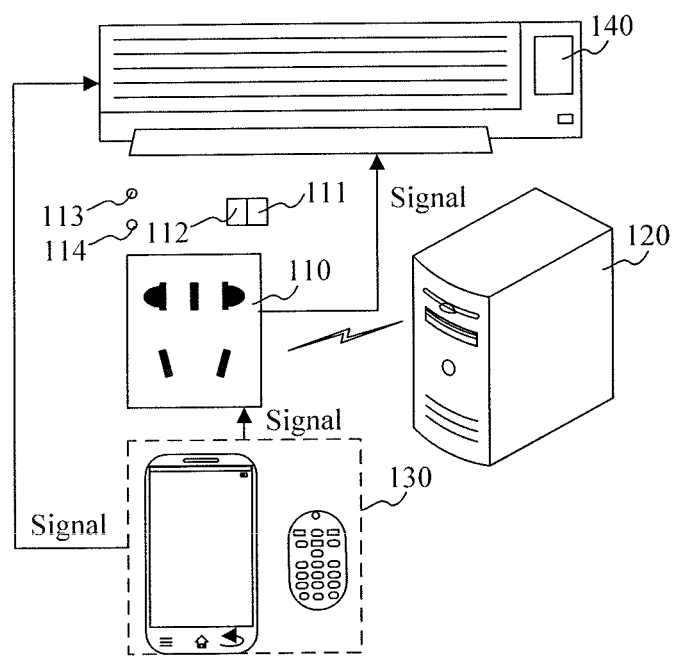
FIG. 1 is a structure diagram of an air conditioner control system, according to an aspect of the disclosure.

In order to make the purpose, technical solutions and advantages of the present disclosure clearer, implementations of the present disclosure will be further described below in detail in combination with the accompanying drawings.

In order to make the present disclosure understood more clearly, a plurality of nouns involved in the present disclosure will be simply introduced at first respectively.

A user set mode refers to a mode in which an air conditioner runs with a working parameter set by a user, for example: the air conditioner runs in a cooling mode under the conditions that a temperature value is 20° C. and a fan speed is at a first level.

A rapid working mode refers to a turning-on rapid cooling mode or turning-on rapid heating mode of the air conditioner.

The turning-on rapid cooling mode refers to a function of reducing a room temperature to a first temperature within a first preset time period according to a rapid cooling working parameter after the air conditioner is turned on, the first preset time period is usually shorter, for example: 1 min, the rapid cooling working parameter usually includes a minimum temperature value (for example, 16° C.) and maximum fun speed (for example, fourth-rate wind) of the air conditioner, and the first temperature is usually lower (for example, 20° C.).

The turning-on rapid heating mode refers to a function of increasing the room temperature to a second temperature within a second preset time period according to a rapid heating working parameter after the air conditioner is turned on, the second preset time period is also shorter, for example: 3 min, the rapid second working parameter usually includes a maximum temperature value (for example, 31° C.) and maximum fun speed (for example, fourth-rate wind) of the air conditioner, and the second temperature is usually higher (for example, 26° C.).

Alternatively or additionally, the first preset time period may be the same as the second preset time period, and may also be different from the second preset time period, which will not be limited in the embodiments. In addition, there are no limits made to specific numerical values of the rapid cooking working parameter, the rapid heating working parameter, the first temperature and the second temperature in the disclosure.

Generally, a user may manually enable a rapid working mode of an air conditioner. However, the user may forget to enable a rapid cooling/rapid heating function or forget to disable the rapid cooling/rapid heating function. Thus, there may exist the problem of lower enabling efficiency of the rapid working mode of the air conditioner. Based on such a problem, the embodiments of the present disclosure provide an air conditioner control method and device. The air conditioner control method discloses the following technical solution: whether an air conditioner is turned on or not is determined through a smart socket; a turning-on remote control signal is sent to a server when it is determined that the air conditioner is turned on; the server determines whether a rapid working mode corresponding to the smart socket is in an enabled state or not; if YES, a first remote control signal is sent to the smart socket; and the smart socket controls the air conditioner to run with a working parameter of the rapid working mode according to the first remote control signal. In such a manner, the user is only required to manually enable the rapid working mode once through the smart socket, and thereafter, the smart socket may control the air conditioner to automatically enable the rapid working mode, so that the enabling efficiency of the rapid working mode of the air conditioner is improved.

FIG. 1 shows a structure diagram of an air conditioner control system, according to an aspect of the disclosure. The air conditioner control system provided by the embodiment includes a smart socket 110, a server 120, a control device 130 and an air conditioner 140.

The control device 130 may be a remote controller. Alternatively or additionally, the control device 130 may be an intelligent terminal such as a mobile phone, a tablet computer and a computer, and the embodiment does not make limitation thereto.

The control device 130 is configured to send a control signal to the smart socket 110 and/or the air conditioner 140, thereby implementing control over the smart socket 110 and/or the air conditioner 140. For example, the air conditioner 140 is controlled to be turned on through the control device 130, and the smart socket 110 is controlled to enable a rapid working mode of the air conditioner 140 through the control device.

The smart socket 110 refers to a socket into which a plug of the air conditioner 140 has been plugged. The smart socket 110 may be integrated with a signal receiving component 111 and a signal sending component 112. It is to be noted that, since data, configured to determine whether the air conditioner is turned on or not or configured to determine whether the air conditioner is in the rapid working mode or not, of the smart socket 110 may be acquired through the built-in signal receiving component 111 or may be acquired through a built-in power statistic component, the signal receiving component or the power statistic component may be arranged in the smart socket as desired, the present disclosure is not limited to the practical application, and both the signal receiving component and the power statistic component may be arranged in the smart socket.

Herein, the signal receiving component 111 is configured to receive a signal sent by the server 120 and/or the control device 130. When the smart socket 110 receives the signal sent by the control device 130, the control device 130 is a remote controller and the signal sent by the remote controller is in an infrared form, the receiving component 111 may be an infrared receiving component, for example, a photodiode; and when the control device is an intelligent terminal and the intelligent terminal sends a wireless signal, the receiving component 111 may be an antenna. When the smart socket 110 receives the signal sent by the server 120, the receiving component 111 may be an antenna.

The signal sending component 112 is configured to send a signal to the air conditioner 130 or the server 120. When the smart socket 110 sends a signal to the air conditioner 140, the signal sending component 112 may be an infrared sending component, for example, an infrared light-emitting diode; and when the smart socket 110 sends a signal to the server 120, the signal sending component 112 may be an antenna.

Alternatively or additionally, for ensuring that the smart socket 110 may communicate with the server 110 through an antenna, the smart socket 110 is further integrated with a wireless communication component 113, for example, a Wireless Fidelity (Wi-Fi) component.

Alternatively or additionally, for detecting whether the air conditioner is turned on or not, the smart socket 110 may further be integrated with the power statistic component 114, and the power statistic component 114 is configured to make statistics on power consumed by the air conditioner 140.

The server 120 is configured to, when the smart socket 110 reports a turning-on remote control signal of the air conditioner, detect whether the smart socket 110 has enabled the rapid working mode or not, when detecting that the rapid working mode has been enabled, notify the smart socket 110 to control the air conditioner 140 to enter the rapid working mode, simultaneously start a timer and notify the smart socket 110 to control the air conditioner 140 to be switched from the rapid working mode to a user set mode according to the timer.

The air conditioner 140 is configured to work under control of the control device 130 and/or the smart socket 110. The air conditioner 140 is integrated with a signal receiving component, and the signal receiving component is usually an infrared receiving component, for example, a photodiode. Alternatively or additionally, the signal receiving component may also include an antenna configured to receive a wireless signal. The embodiment does not make limitation thereto.

Figure 2A:
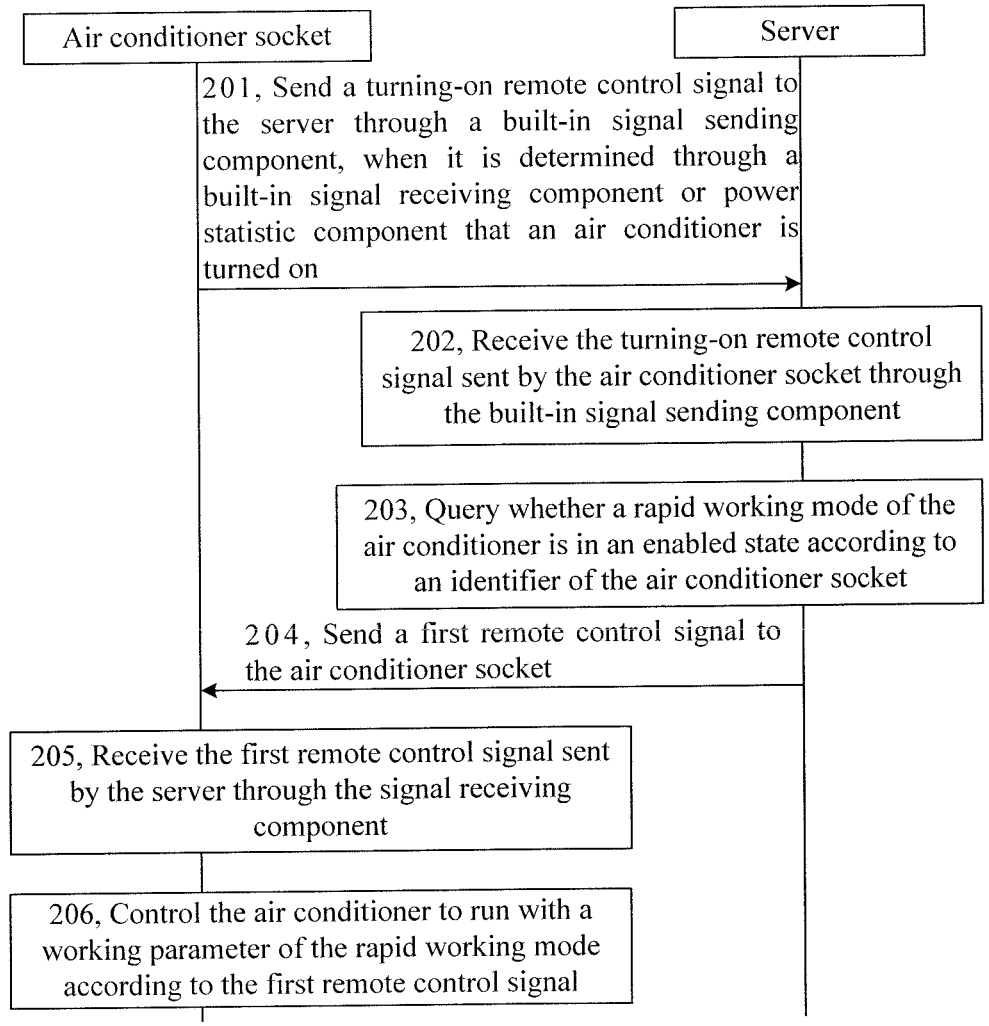
FIG. 2A is an interaction diagram of an air conditioner control method, according to an aspect of the disclosure.

FIG. 2A shows an interaction diagram of an air conditioner control method, according to an embodiment. The method is applied to an air conditioner control system shown in FIG. 1, and the method includes the following steps.

In Step 201, a smart socket sends, through a built-in signal sending component, a turning-on remote control signal to a server when determining, through a built-in signal receiving component or power statistic component, that an air conditioner is turned on.

Herein, the turning-on remote control signal contains an identifier of the smart socket, and a plug of the air conditioner has been plugged into the smart socket.

The smart socket determines that the air conditioner is turned on in, but not limited to, the following manners.

In one manner, the smart socket determines whether the air conditioner is turned on or not according to a turning-on signal sent by a control device. At this moment, the smart socket receives the turning-on signal sent by the control device through the built-in signal receiving component, and when receiving the turning-on signal, determines that the air conditioner is turned on and generates the turning-on remote control signal. The turning-on signal sent by the control device may be in an infrared signal form, or may be in a wireless signal form, which will not be limited in the embodiment.

In another implementation manner, the smart socket determines whether the air conditioner is turned on or not according to power, on which statistics is made by the built-in power statistic component, consumed by the air conditioner. At this moment, if the power, on which statistics is made by the built-in power statistic component, consumed by the air conditioner is higher than a turning-on threshold value, the smart socket determines that the air conditioner is turned on, and generates the turning-on remote control signal. Herein, the embodiment does not make limitation to a specific numerical value of the turning-on threshold value.

In Step 202, the server receives the turning-on remote control signal sent by the smart socket through the built-in signal sending component.

In Step 203, the server queries whether a rapid working mode of the air conditioner is in an enabled state or not according to an identifier of the smart socket. For example, the server may determine whether the rapid working mode of the air conditioner is enabled using the identifier of the smart socket as a query index.

In the embodiment, the server determines whether the rapid working mode of the air conditioner is in the enabled state or not according to the identifier of the smart socket, and if YES, notifies the smart socket to control the air conditioner to run in the rapid working mode, then a user does not have to manually enable the rapid working mode of the air conditioner, and the air conditioner may automatically run in the rapid working mode after being turned on, so that enabling efficiency of the rapid working mode of the air conditioner is improved, that is, intelligence of the air conditioner is achieved through the smart socket.

A corresponding relationship between the identifier of the smart socket and a working state of the rapid working mode is recorded in the server, where the smart socket has established a communication with the server. The smart socket may send usage information about the connected air conditioner or other appliances to the server from time to time. According to the corresponding relationship, the server may determine whether the rapid working mode of the air conditioner corresponding to the identifier of the smart socket in the turning-on remote control signal is in the enabled state or not. When the server determines that the rapid working mode of the air conditioner is in the enabled state, Step 204 is executed; and when the server determines that the rapid working mode of the air conditioner is in a disabled state, the flow is ended. Herein the working state includes the enabled state and disabled state of the rapid working mode. The corresponding relationship is determined according to an enabling remote control signal reported by the smart socket, and the enabling remote control signal is configured to request the server to set the rapid working mode of the air conditioner into the enabled state.

Figure 2B:
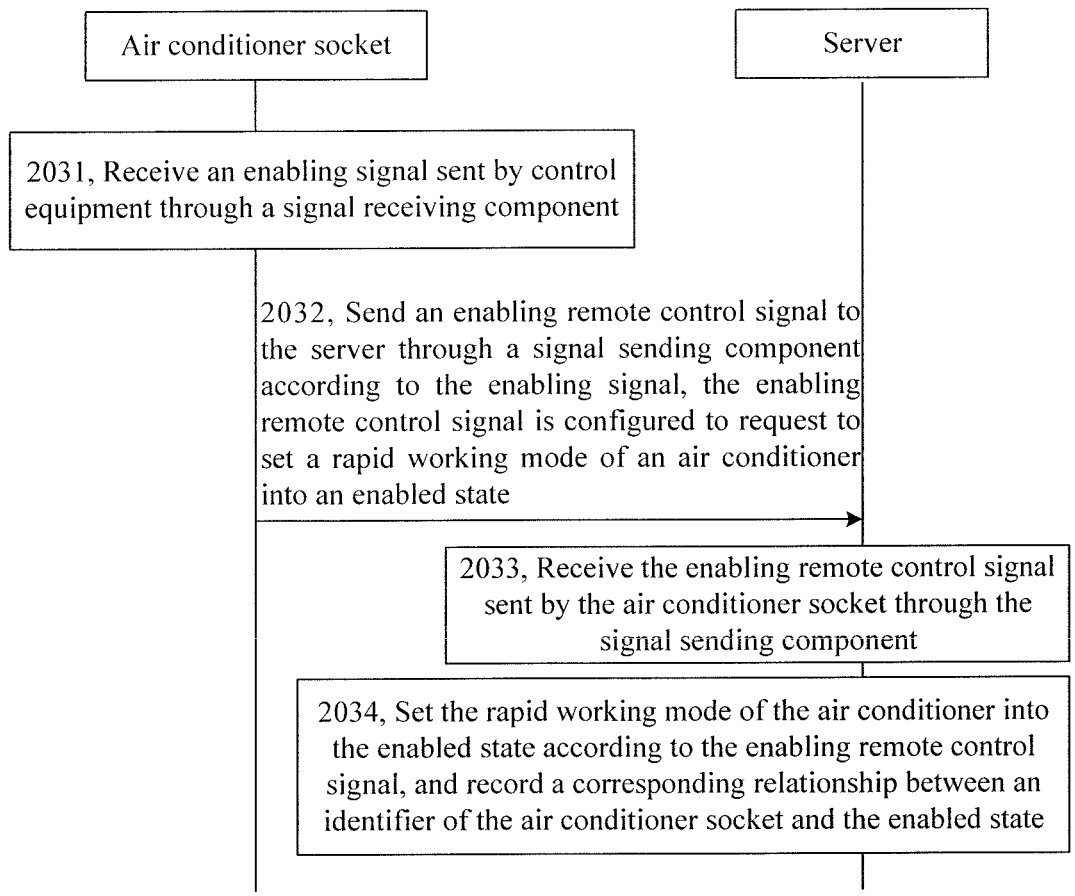
FIG. 2B is an interaction diagram of a method for determining a corresponding relationship, according to an aspect of the disclosure.

Referring to FIG. 2B, the server determines the corresponding relationship according to the enabling remote control signal reported by the smart socket, including the following steps.

In Step 2031, the smart socket receives, through the signal receiving component, an enabling signal sent by a control device.

When the control device is a remote controller, the smart socket receives, through the signal receiving component, an enabling signal in an infrared signal form from the remote controller, and the enabling signal includes an infrared code corresponding to enabling of the rapid working mode.

When the control device is an intelligent terminal, the smart socket establishes a communication connection with the intelligent terminal through a communication component; the intelligent terminal displays the rapid working mode of the air conditioner; when the intelligent terminal receives an enabling operation of the user over the rapid working mode, it generates an enabling signal; the intelligent terminal sends the enabling signal to the smart socket; and the smart socket receives the enabling signal through the signal receiving component.

Figure 2C:
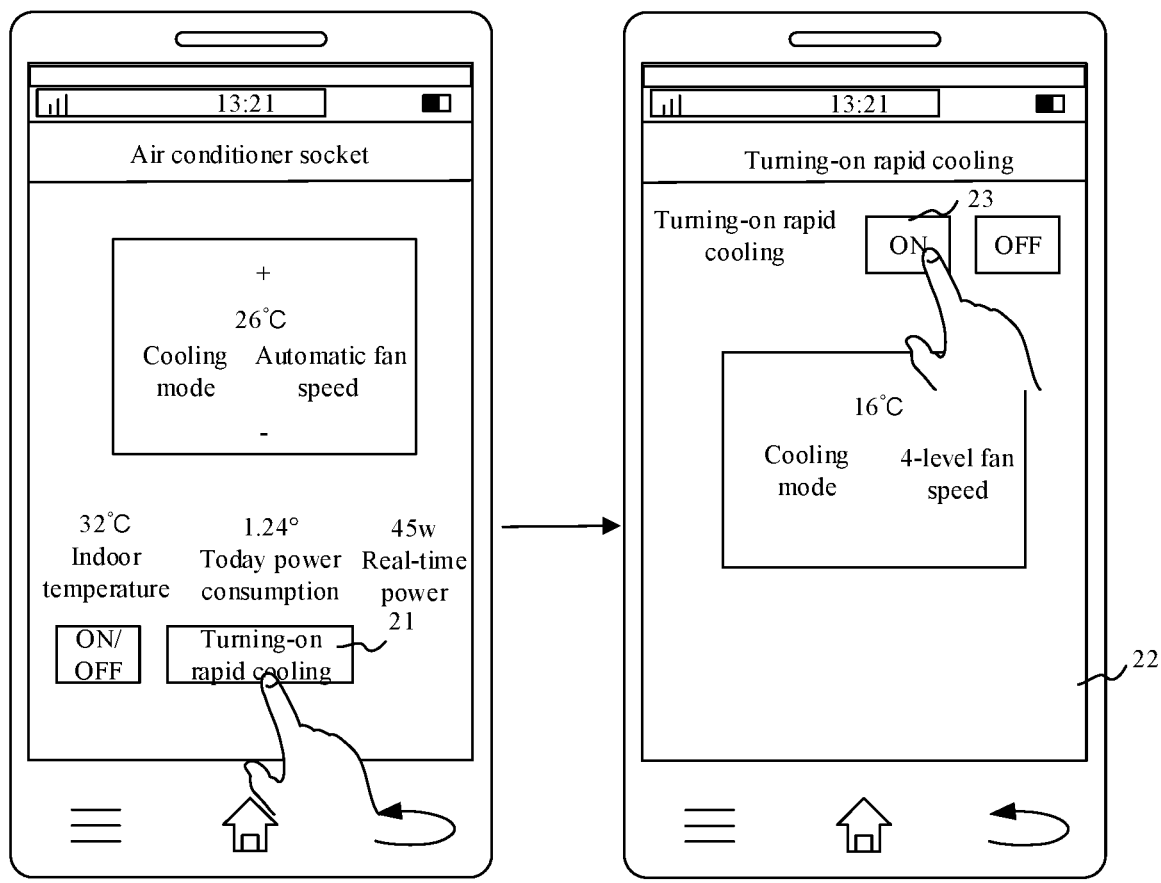
FIG. 2C is a schematic diagram illustrating enabling of a rapid working mode, according to an aspect of the disclosure.

If a control interface displayed by the intelligent terminal for the smart socket is shown in FIG. 2C, after the user clicks to select a turning-on rapid cooling option 21 in the control interface, a turning-on rapid cooling setting interface 22 is displayed; after the intelligent terminal receives an enabling operation over an enabling option 23 in the setting interface 22, an enabling signal is generated, and the enabling signal is sent to the smart socket; and the smart socket receives the enabling signal.

In Step 2032, the smart socket sends, through the signal sending component, an enabling remote control signal to the server according to the enabling signal. The enabling remote control signal is configured to request the rapid working mode of the air conditioner to be set into the enabled state.

In Step 2033, the server receives the enabling remote control signal sent by the smart socket through the signal sending component.

In Step 2034, the server sets the rapid working mode of the air conditioner into the enabled state according to the enabling remote control signal, and records a corresponding relationship between the identifier of the smart socket and the enabled state.

An example corresponding relationship recorded in the server is shown in the following Table 1. When the identifier of the smart socket in a turning-on time received by the server is 1, the server queries the corresponding relationship to learn about that the rapid working mode of the air conditioner is in the enabled state.

TABLE 1

| Identifier | Working state |
|---|---|
| 1 | Enabled state |
| 2 | Disabled state |
| 3 | Enabled state |

It is to be noted that Steps 2031-2034 are executed before Step 201.

In Step 204, the server sends a first remote control signal to the smart socket.

The first remote control signal is configured to instruct the smart socket to control the air conditioner to run with working parameter of the rapid working mode when receiving the first remote control signal through the signal receiving component. When the rapid working mode is a turning-on rapid cooling mode, the working parameter is a rapid cooling working parameter. When the rapid working mode is a turning-on rapid heating mode, the working parameter is a rapid heating working parameter. There are no limits made to specific parameters of the rapid cooling working parameter and the rapid heating working parameter. For example, the rapid cooling working parameter may include at least one of: a minimum temperature value, a maximum fan speed, and cooling mode of the air conditioner. The rapid heating working parameter may include a maximum temperature value, a maximum fan speed, and heating mode of the air conditioner.

Alternatively or additionally, when the rapid working mode includes the turning-on rapid cooling mode and the turning-on rapid heating mode, the first remote control signal further includes an identifier of the rapid working mode, and the identifier is configured to instruct the turning-on rapid cooling mode or the turning-on rapid heating mode.

In Step 205, the smart socket receives, through the signal receiving component, the first remote control signal sent by the server.

In Step 206, the smart socket controls the air conditioner to run with a working parameter of the rapid working mode according to the first remote control signal.

The first remote control signal includes the identifier of the rapid working mode, or, the first remote control signal includes the working parameter of the rapid working mode.

The smart socket controls the air conditioner to run with the working parameter of the rapid working mode according to the first remote control signal in, but not limited to, the following implementation manners.

In a first implementation manner, when the signal receiving component integrated in the air conditioner is an infrared receiving component, the smart socket performs infrared coding on the identifier of the rapid working mode in the first remote control signal to generate the enabling signal, or, performs infrared coding on the working parameter of the rapid working mode in the first remote control signal to generate the enabling signal, and sends, through the infrared sending component, the enabling signal in the infrared signal form to the air conditioner. Correspondingly, the air conditioner receives the enabling signal through the infrared receiving component, and runs with the rapid working mode instructed by the enabling signal.

In another implementation manner, when the signal receiving component integrated in the air conditioner is an antenna, the smart socket sends the identifier of the rapid working mode in the first remote control signal through the antenna, and correspondingly, the air conditioner receives the identifier through the antenna, and runs with the working parameter of the rapid working mode according to the identifier; or, the smart socket sends the working parameter of the rapid working mode in the first remote control signal through the antenna, and correspondingly, the air conditioner receives the working parameter through the antenna, and runs with the working parameter.

In view of the above, according to the air conditioner control method provided by the embodiment of the present invention, when the turning-on remote control signal is received from the smart socket through the signal sending component, the server queries whether the rapid working mode of the air conditioner is in the enabled state or not according to the identifier of the smart socket in the turning-on remote control signal; if YES, the first remote control signal is sent to the smart socket to enable the smart socket to control the air conditioner to run with the working parameter of the rapid working mode according to the first remote control signal when receiving the first remote control signal through the signal receiving component, and then the user does not have to manually enable the rapid working mode of the air conditioner every time when the air conditioner is turned on; and therefore, the problem of low enabling efficiency of the rapid working mode of the air conditioner every time when the user manually enables the rapid working mode of the air conditioner is solved. The server may control the air conditioner which is turned on to automatically enable the rapid working mode through the smart socket according to the enabled state corresponding to the identifier of the smart socket, so that the enabling efficiency of the rapid working mode of the air conditioner is improved.

In addition, the smart socket determines that the air conditioner is turned on according to the turning-on signal received by the signal receiving component; or, the smart socket determines that the air conditioner is turned on according to the power on which statistics is made by the power statistic component, so that multiple implementation manners are provided for the smart socket to determine whether the air conditioner is turned on or not.

It is to be noted that Steps 202-204, 2033 and 2034 may be independently implemented as method embodiments at a server side and Steps 201, 205 and 206 and 2031 and 2032 may be independently implemented as method embodiments at a smart socket side, which will not be limited in the embodiment.

Alternatively or additionally, a corresponding relationship between the identifier of the smart socket and another working mode may also be pre-stored in the server, for example, a heating mode, a cooling mode and an automatic mode. Similarly, according to the method provided by the embodiment, intelligent enabling of the other working mode of the air conditioner is controlled.

Alternatively or additionally, for ensuring that the rapid working mode of the air conditioner can be switched into a user set mode without manual disabling of the user after being enabled, when determining that the rapid working mode of the air conditioner is in the enabled state, the server further starts a timer, and controls the air conditioner to be automatically switched from the rapid working mode to the user set mode through the smart socket according to the timer.

Figure 3:
FIG. 3 is an interaction diagram of an air conditioner control method, according to another aspect of the disclosure.

FIG. 3 shows an interaction diagram of an air conditioner control method, according to another aspect of the disclosure. The air conditioner control method is applied to an air conditioner control system shown in FIG. 1, and based on the embodiment shown in FIG. 2A, the method includes the following steps.

In Step 301, a smart socket sends, through a signal sending component, a working parameter of a user set mode to a server.

The smart socket sends the working parameter of the user set mode to the server in, but not limited to, the following manners.

In one manner, when a user controls an air conditioner to be turned on through a control device, the working parameter of the user set mode is carried in a turning-on signal sent to the control device through the signal sending component. At this moment, when sending a turning-on remote control signal to the server through the signal sending component, the smart socket adds the working parameter of the user set mode in the turning-on signal into the turning-on remote control signal, and sends it to the server through the signal sending component. At this moment, Step 301 and Step 201 are executed at the same time.

In another manner, after the user controls the air conditioner to be turned on through the control device, a control signal is further sent to the air conditioner to regulate a working parameter of the air conditioner through the control device, and the control signal carries the working parameter of the user set mode. At this moment, when receiving the control signal sent by the control device through a signal receiving component, the smart socket sends the working parameter of the user set mode in the control signal to the server through the signal sending component. At this moment, Step 301 is executed after Step 201.

After Step 203, in Step 302, if a rapid working mode of the air conditioner is in an enabled state, the server starts a timer of a preset time period threshold value.

Since power consumption is high if the air conditioner runs with the working parameter of the rapid working mode, in the embodiment, after the server determines that the rapid working mode of the air conditioner is in the enabled state, the timer of the preset time period threshold value is started, and the air conditioner is controlled, through the smart socket, to be switched from the rapid working mode to the user set mode after a time period set at the timer. Therefore, the problems of high power consumption and resource waste of the air conditioner due to the fact that the user forgets to disable the rapid working mode of the air conditioner are solved, and power consumed by the air conditioner is reduced. Herein, the preset time period threshold value of the timer may be 20 minutes, 10 minutes and the like, which will not be limited in the embodiment.

Alternatively or additionally, Step 302 may be executed before Step 204, may also be executed after Step 204, and may further be executed simultaneously with Step 204.

In Step 303, when the timer reaches the preset time period threshold value, the server queries the working parameter of the user set mode corresponding to the air conditioner according to an identifier of the smart socket.

Herein, the working parameter of the user set mode is carried in the turning-on remote control signal for sending by the smart socket, or, the working parameter of the user set mode is sent when the smart socket receives the control signal sent by the control device.

In Step 304, the server generates a second remote control signal according to the working parameter of the user set mode.

The second remote control signal is configured to instruct the smart socket to control the air conditioner to be switched from the working parameter of the rapid working mode to the working parameter of the user set mode for running when receiving the second remote control signal through the signal receiving component.

In Step 305, the server sends the second remote control signal to the smart socket.

In Step 306, the smart socket receives, through the signal receiving component, the second remote control signal sent by the server when the timer reaches the preset time period threshold value.

In Step 307, the smart socket controls, through the preset signal sending component, the air conditioner to be switched from the working parameter of the rapid working mode to the working parameter of the user set mode for running according to the second remote control signal.

The smart socket controls the air conditioner to be switched from the working parameter of the rapid working mode to the working parameter of the user set mode for running according to the second remote control signal in, but not limited to, the following implementation manners.

In one implementation manner, when the signal receiving component integrated in the air conditioner is an infrared receiving component, the smart socket performs infrared coding on the working parameter of the user set mode in the second remote control signal to generate a switching signal, and the switching signal in the infrared signal form is sent to the air conditioner through the infrared sending component. Correspondingly, the air conditioner receives the switching signal through the infrared receiving component, and runs with the working parameter of the user set mode in the switching signal.

In another implementation manner, when the signal receiving component integrated in the air conditioner is an antenna, the smart socket sends the working parameter of the user set mode in the second remote control signal through the antenna. Correspondingly, the air conditioner receives the working parameter of the user set mode through the antenna, and runs with the working parameter of the user set mode.

In view of the above, according to the air conditioner control method provided by the embodiment of the present disclosure, after the server determines that the rapid working mode of the air conditioner is in the enabled state, the timer of the preset time period threshold value is started; and when the timer reaches the preset time period threshold value, the second remote control signal is sent to the smart socket to enable the smart socket to control the air conditioner to be switched from the working parameter of the rapid working mode to the working parameter of the user set mode for running according to the second remote control signal when receiving the second remote control signal through the signal receiving component, so that the problem of high power consumption of the air conditioner due to the fact that the user forgets to disable the rapid working mode when the air conditioner runs in the rapid working mode is solved. Since power consumed by the air conditioner during running in the user set mode is lower than power consumed during running in the rapid working mode, an effect of reducing the power consumed by the air conditioner is achieved.

It is to be noted that Steps 302-305 may be independently implemented as method embodiment at the server side and Steps 301, 306 and 307 may be independently implemented as method embodiments at the smart socket side, which will not be limited in the embodiment.

Alternatively or additionally, a corresponding relationship between the identifier of the smart socket and another working mode may also be pre-stored in the server, for example: a heating mode, a cooling mode and an automatic mode. Similarly, according to the method provided by the embodiment, intelligent enabling of the other working mode of the air conditioner is controlled.

The below is device embodiments of the present disclosure, which may be configured to execute the above methods in the present disclosure. For details undisclosed in the device embodiments of the present disclosure, the method embodiments of the present disclosure may be referred to.

Figure 4:
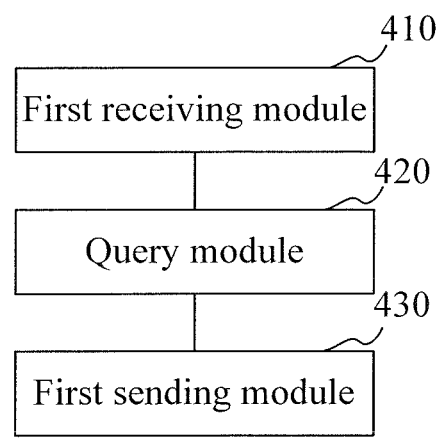
FIG. 4 is a block diagram of an air conditioner control device, according to an aspect of the disclosure.

FIG. 4 is a block diagram of an air conditioner control device, according to an aspect of the disclosure. The device has a function of implementing the above method examples, and the function may be realized by hardware, or may be realized by executing corresponding software through the hardware. The device is applied to a server, and the device may include a first receiving module 410, a query module 420 and a first sending module 430.

The first receiving module 410 is configured to implement Step 202.

The query module 420 is configured to implement Step 203.

The first sending module 430 is configured to implement Step 204.

For related details, the method embodiment shown in FIG. 2A may be referred to.

In view of the above, according to the air conditioner control device provided by the present disclosure, when a turning-on remote control signal is received from a smart socket through a signal sending component, the server queries whether a rapid working mode of an air conditioner is in an enabled state or not according to an identifier of the smart socket in the turning-on remote control signal; if YES, a first remote control signal is sent to the smart socket to enable the smart socket to control the air conditioner to run with a working parameter of the rapid working mode according to the first remote control signal when receiving the first remote control signal through a signal receiving component, and then a user does not have to manually enable the rapid working mode of the air conditioner every time when the air conditioner is turned on; and therefore, the problem of low enabling efficiency of the rapid working mode of the air conditioner every time when the user manually enables the rapid working mode of the air conditioner is solved. The server may control the air conditioner which is turned on to automatically enable the rapid working mode through the smart socket according to the enabled state corresponding to the identifier of the smart socket, so that the enabling efficiency of the rapid working mode of the air conditioner is improved.

Figure 5:
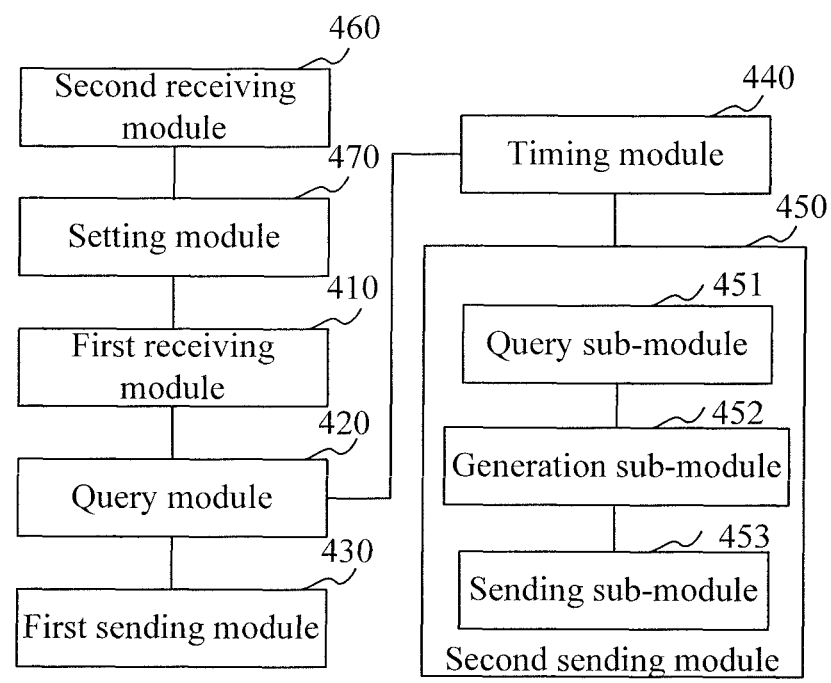
FIG. 5 is a block diagram of an air conditioner control device, according to another aspect of the disclosure.

FIG. 5 is a block diagram of an air conditioner control device, according to an aspect of the disclosure. The device has a function of implementing the above method examples, and the function may be realized by hardware, and may also be realized by executing corresponding software through the hardware. The device is applied to a server, and based on the device shown in FIG. 4. Alternatively or additionally, the device further includes: a timing module 440 and a second sending module 450.

The timing module 440 is configured to implement Step 302.

The second sending module 450 is configured to, when a timer started by the timing module reaches a preset time period threshold value, send a second remote control signal to the smart socket.

Alternatively or additionally, the second sending module 450 includes: a query sub-module 451, a generation sub-module 452 and a sending sub-module 453.

The query sub-module 451 is configured to implement Step 303.

The generation sub-module 452 is configured to implement Step 304.

The sending sub-module 453 is configured to implement Step 305.

Alternatively or additionally, the device further includes: a second receiving module 460 and a setting module 470.

The second receiving module 460 is configured to implement Step 2033.

The setting module 470 is configured to implement Step 2034.

For related details, the method embodiments shown in FIG. 2A and FIG. 3 may be referred to.

It is to be noted that, when the device provided by the embodiments realizes its function, descriptions are made only with division of each of the abovementioned function modules as an example, and during a practical application, the function may be allocated to different function modules for realization according to a practical requirement, that is, a content structure of a device is divided into different function modules to realize all or part of the function described above.

With respect to the devices in the above embodiments, the specific manners for performing operations for individual modules therein have been described in detail in the embodiments regarding the methods, which will not be elaborated herein.

Figure 6:
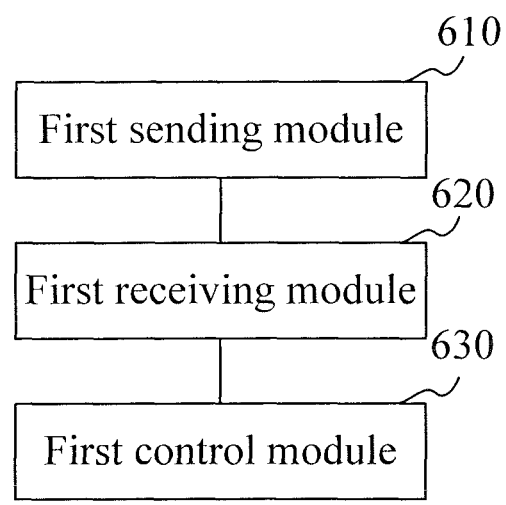
FIG. 6 is a block diagram of an air conditioner control device, according to an aspect of the disclosure.

FIG. 6 is a block diagram of an air conditioner control device, according to an aspect of the disclosure. The device has a function of implementing the above method examples, and the function may be realized by hardware, or may be realized by executing corresponding software through the hardware. The device is applied to a smart socket, and the device may include: a first sending module 610, a first receiving module 620 and a first control module 630.

The first sending module 610 is configured to implement Step 201.

The first receiving module 620 is configured to implement Step 205.

The first control module 630 is configured to implement Step 206.

For related details, the method embodiments shown in FIG. 2A may be referred to.

Figure 7:
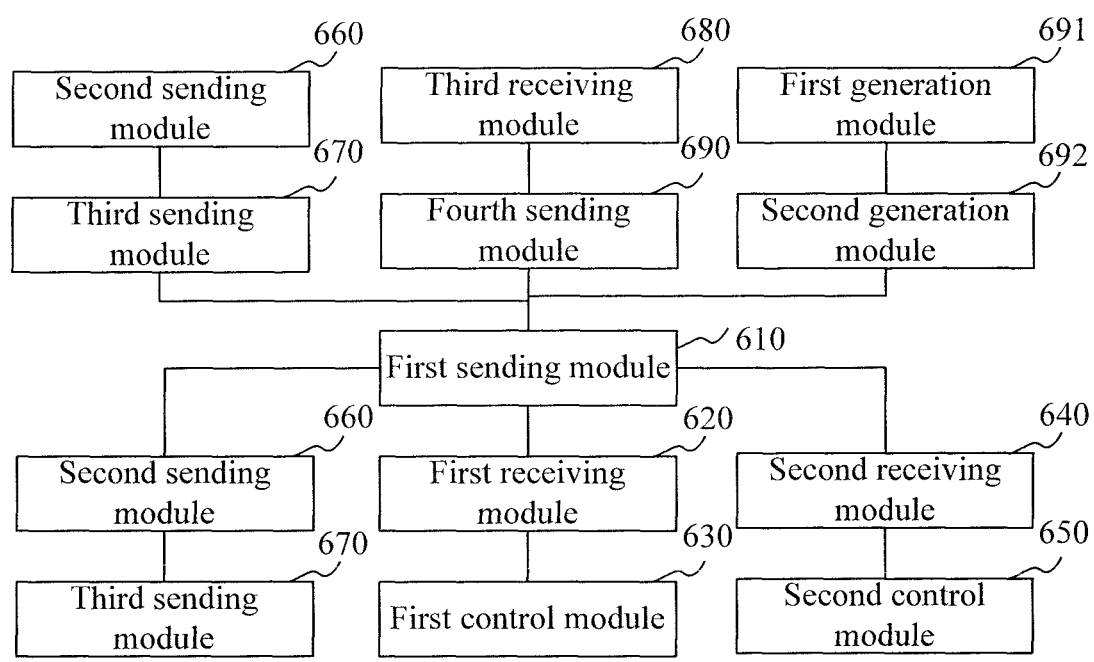
FIG. 7 is a block diagram of an air conditioner control device, according to another aspect of the disclosure.

FIG. 7 is a block diagram of an air conditioner control device, according to an aspect of the disclosure. The device has a function of implementing the above method examples, and the function may be realized by hardware, and may also be realized by executing corresponding software through the hardware. The device is applied to a smart socket, and based on the air conditioner control device shown in FIG. 6, the device may include: a second receiving module 640 and a second control module 650.

The second receiving module 640 is configured to implement Step 306.

The second control module 650 is configured to implement Step 307.

Alternatively or additionally, the device further includes: a second sending module 660 and a third sending module 670.

The second sending module 660 is configured to, when a turning-on remote control signal is to be sent through a signal sending component, add a working parameter of a user set mode into the turning-on remote control signal for sending to a server through the signal sending component.

The third sending module 670 is configured to, when receiving a control signal sent by a control device through a signal receiving component, send, through the signal sending component, the working parameter of the user set mode in the control signal to the server, the control signal being configured to control an air conditioner to run with the working parameter of the user set mode.

Alternatively or additionally, the device further includes: a third receiving module 680 and a fourth sending module 690.

The third receiving module 680 is configured to implement Step 2031.

The fourth sending module 690 is configured to implement Step 2032.

Alternatively or additionally, the device further includes a first generation module 691 and a second generation module 692.

The first generation module 691 is configured to, when receiving a turning-on signal sent by the control device through a signal receiving component, determine that the air conditioner is turned on, and generate the turning-on remote control signal.

The second generation module 692 is configured to, when power, on which statistics is made by a preset power statistic component, consumed by the air conditioner is higher than a turning-on threshold value, determine that the air conditioner is turned on, and generate the turning-on remote control signal.

The present disclosure further provides an air conditioner control device, which may implement an air conditioner method provided by the present disclosure. The device is applied to a server, and the device includes: a processor, and a memory configured to store instructions executable by the processor, wherein the processor is configured to:

receive a turning-on remote control signal sent by a smart socket through a built-in signal sending component, wherein the turning-on remote control signal is a signal generated and sent by the smart socket after it is determined that an air conditioner is turned on, the turning-on remote control signal carries an identifier of the smart socket, and a plug of the air conditioner has been plugged into the smart socket;

query whether a rapid working mode of the air conditioner is in an enabled state or not according to the identifier of the smart socket, the rapid working mode being a turning-on rapid cooling mode or a turning-on rapid heating mode; and if the rapid working mode of the air conditioner is in the enabled state, send a first remote control signal to the smart socket, the first remote control signal being configured to instruct the smart socket to control the air conditioner to run with a working parameter of the rapid working mode when receiving the first remote control signal through the signal receiving component.

The present disclosure further provides an air conditioner control device, which may implement an air conditioner method provided by the present disclosure. The device is applied to a smart socket, and the device includes: a processor, and a memory configured to store an instruction executable by the processor, wherein the processor is configured to:

when it is determined, through a built-in signal receiving component or power statistic component, that an air conditioner is turned on, send, through a built-in signal sending component, a turning-on remote control signal to a server, wherein the turning-on remote control signal carries an identifier of a smart socket, the turning-on remote control signal is configured to trigger the server to query whether a rapid working mode of the air conditioner is in an enabled state or not according to the identifier, the rapid working mode is a turning-on rapid cooling mode or a turning-on rapid heating mode, and a plug of the air conditioner has been plugged into the smart socket;

receive, through the signal receiving component, a first remote control signal sent by the server, the first remote control signal being sent when the server finds that the rapid working mode of the air conditioner is in the enabled state; and control the air conditioner to run with a working parameter of the rapid working mode according to the first remote control signal.

Figure 8:
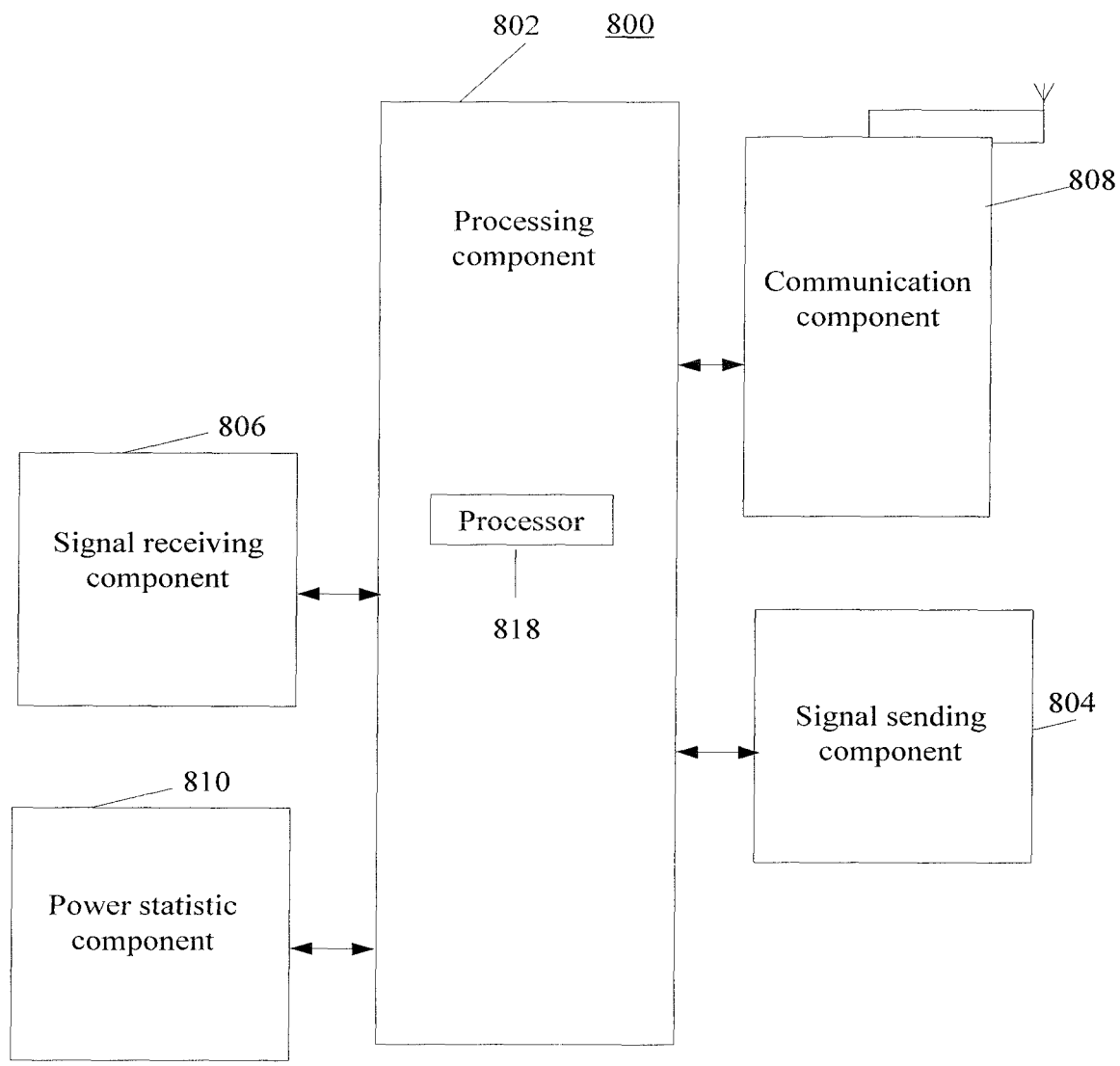
FIG. 8 is a block diagram of a smart socket, according to an aspect of the disclosure.

FIG. 8 is a block diagram of a smart socket 800, according to an aspect of the disclosure. Referring to FIG. 8, the smart socket 800 may include one or more of the following components: a processing component 802, a signal sending component 804, a signal receiving component 806, a communication component 808 and a power statistic component 810.

The processing component 802 typically controls overall operations of the smart socket 800, such as the operations associated with data communications. The processing component 802 may include one or more processors 818 to execute instructions to perform all or part of the steps in the abovementioned method. Moreover, the processing component 802 may include one or more modules which facilitate interaction between the processing component 802 and the other components.

The signal sending component 804 is configured to send a signal to other device, and the signal sending component 804 may be an infrared sender, or may be an antenna, which will not be limited in the embodiment.

The signal receiving component 806 is configured to send a signal to other device, and the signal receiving component 806 may be an infrared receiver, and may also be an antenna, which will not be limited in the embodiment.

The communication component 808 is configured to facilitate communication between the smart socket 800 and a server. The smart socket 800 may access a communication-standard-based wireless network, such as a WI-FI network, a 2nd-Generation (2G) or 3rd-Generation (3G) network or a combination thereof. Or, in an aspect of the disclosure, the communication component 808 receives a broadcast signal or broadcast associated information from an external broadcast management system through a broadcast channel. In an aspect of the disclosure, the communication component 808 further includes a Near Field Communciation (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

The power statistic component 810 is configured to count power consumed by an air conditioner.

In an aspect of the disclosure, the smart socket 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

Figure 9:
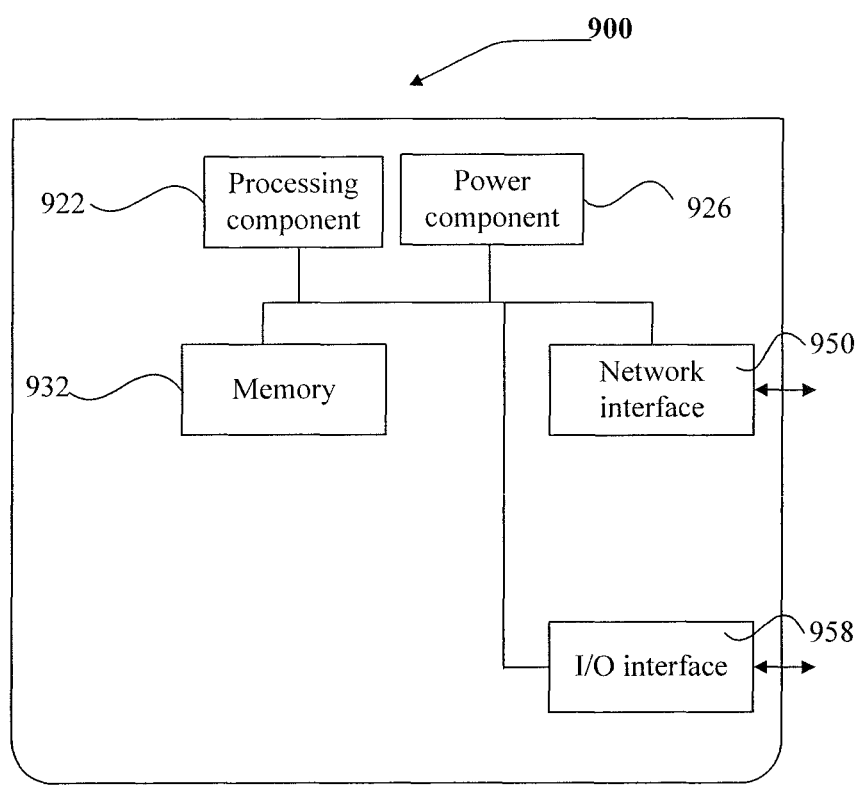
FIG. 9 is a block diagram of a server, according to an aspect of the disclosure.

FIG. 9 is a block diagram of a server, according to an aspect of the disclosure. Referring to FIG. 9, the device 900 includes a processing component 922, further including one or more processors, and a memory resource represented by a memory 932, configured to store instructions executable by the processing component 922, such as application programs. The application programs stored in the memory 932 may include one or more than one module of which each corresponds to a set of instructions. In addition, the processing component 922 is configured to execute the instructions, so as to execute an order generation method.

The device 900 may further include a power component 926 configured to execute power management of the device 900, a wired or wireless network interface 950 configured to connect the device 900 to a network, and an Input/Output (I/O) interface 958. The device 900 may be operated on the basis of an operating system stored in the memory 932, such as Windows Server™, Mac OS X™, Unix™, Linux™ or FreeBSD™.

It should be understood that "multiple" mentioned in the present disclosure refers to two or more than two. "And/or" describes an association relationship of associated objects, and represents that there may exist three relationships, for example: A and/or B may represent the following three conditions: A independently exists, A and B simultaneously exist, and B independently exists. Character "/" usually represents that former and latter associated objects form an "or" relationship.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for controlling an air conditioner, comprising:
    receiving a turning-on remote control signal sent by a smart socket through a built-in signal sending component, wherein the turning-on remote control signal is generated and sent by the smart socket after determining that the air conditioner is turned on, wherein the turning-on remote control signal comprises an identifier of the smart socket, and wherein a plug of the air conditioner has been plugged into the smart socket;
    determining that a rapid working mode of the air conditioner is enabled according to a corresponding relationship between the identifier of the smart socket and a working state of the air conditioner, the rapid working mode being one of a turning-on rapid cooling mode and a turning-on rapid heating mode, wherein the corresponding relationship is pre-recorded in a server;
    when the rapid working mode of the air conditioner is enabled, sending a first remote control signal to the smart socket, wherein the first remote control signal is configured to instruct the smart socket to control the air conditioner to run with a working parameter of the rapid working mode when the smart socket receiving the first remote control signal through a built-in signal receiving component;
    after the rapid working mode of the air conditioner is enabled, starting a timer of a preset time period threshold value; and
    after the timer reaches the preset time period threshold value, querying a working parameter of a user set mode corresponding to the air conditioner according to the identifier of the smart socket, wherein the working parameter of the user set mode is carried in the turning-on remote control signal for sending by the smart socket, or, the working parameter of the user set mode is sent after the smart socket receives a control signal sent by a control device; generating a second remote control signal according to the working parameter of the user set mode; sending the second remote control signal to the smart socket, wherein the second remote control signal is configured to instruct the smart socket to control, after receiving the second remote control signal through the built-in signal receiving component, the air conditioner to be switched from the working parameter of the rapid working mode to the working parameter of the user set mode for running.

2. The method of claim 1, further comprising:

receiving an enabling remote control signal sent by the smart socket through the built-in signal sending component, wherein the enabling remote control signal is configured to request to set the rapid working mode of the air conditioner into the enabled state; and setting the rapid working mode of the air conditioner into the enabled state according to the enabling remote control signal, and recording a corresponding relationship between the identifier of the smart socket and the enabled state.

3. A method for controlling an air conditioner, comprising:

after determining, by a smart socking comprising a built-in signal receiving component, that an air conditioner is turned on, sending, through a built-in signal sending component, a turning-on remote control signal to a server, wherein the turning-on remote control signal contains an identifier of a smart socket, the turning-on remote control signal is configured to trigger the server to query whether a rapid working mode of the air conditioner is in an enabled state according to a corresponding relationship between the identifier and a working state of the air conditioner, the rapid working mode is a turning-on rapid cooling mode or a turning-on rapid heating mode, and a plug of the air conditioner has been plugged into the smart socket, wherein the corresponding relationship is pre-recorded in the server;

receiving, through the built-in signal receiving component, a first remote control signal sent by the server, wherein the first remote control signal is sent after the server finds that the rapid working mode of the air conditioner is in the enabled state;

controlling the air conditioner to run with a working parameter of the rapid working mode according to the first remote control signal;

receiving, through the built-in signal receiving component, a second remote control signal sent by the server after a timer reaches a preset time period threshold value, wherein the timer is started after the server determines that the rapid working mode of the air conditioner is in the enabled state; and controlling, through the built-in signal sending component, the air conditioner to be switched from the working parameter of the rapid working mode to a working parameter of a user set mode for running according to the second remote control signal.

4. The method of claim 3, further comprising:

when the turning-on remote control signal is to be sent through the built-in signal sending component, adding the working parameter of the user set mode into the turning-on remote control signal for sending to the server through the built-in signal sending component; and when a control signal sent by a control device is received through the built-in signal receiving component, sending, through the built-in signal sending component, the working parameter of the user set mode in the control signal to the server, wherein the control signal is configured to control the air conditioner to run with the working parameter of the user set mode.

5. The method of claim 3, further comprising:

receiving, through the built-in signal receiving component, an enabling signal sent by a control device; and sending, through the built-in signal sending component, an enabling remote control signal to the server according to the enabling signal, wherein the enabling remote control signal is configured to request to set the rapid working mode of the air conditioner into the enabled state.

6. The method of claim 3, further comprising:

when a turning-on signal sent by a control device is received through the built-in signal receiving component, determining that the air conditioner is turned on, and generating the turning-on remote control signal; and responsive to determining, through a power statistic meter, that power consumed by the air conditioner is higher than a turning-on threshold value, determining that the air conditioner is turned on, and generating the turning-on remote control signal.

7. An air conditioner control device, comprising:

a processor; and a memory configured to store an instruction executable by the processor, wherein the processor is configured to:

receive a turning-on remote control signal sent by a smart socket through a built-in signal sending component, wherein the turning-on remote control signal is a signal generated and sent by the smart socket after the smart socket determines that an air conditioner is turned on, the turning-on remote control signal contains an identifier of the smart socket, and a plug of the air conditioner has been plugged into the smart socket;

query whether a rapid working mode of the air conditioner is in an enabled state or not according to a corresponding relationship between the identifier of the smart socket and a working state of the air conditioner, the rapid working mode being a turning-on rapid cooling mode or a turning-on rapid heating mode, wherein the corresponding relationship is pre-recorded in a server;

if the rapid working mode of the air conditioner is in the enabled state, send a first remote control signal to the smart socket, wherein the first remote control signal is configured to instruct the smart socket to control the air conditioner to run with a working parameter of the rapid working mode when the smart socket receives the first remote control signal through a built-in signal receiving component;

when the rapid working mode of the air conditioner is in the enabled state, start a timer of a preset time period threshold value; and when the timer reaches the preset time period threshold value, query a working parameter of a user set mode corresponding to the air conditioner according to the identifier of the smart socket, wherein the working parameter of the user set mode is carried in the turning-on remote control signal for sending by the smart socket, or, the working parameter of the user set mode is sent when the smart socket receives a control signal sent by a control device; qenerate a second remote control signal according to the working parameter of the user set mode; send the second remote control signal to the smart socket, wherein the second remote control signal is configured to instruct the smart socket to control, when receiving the second remote control signal through the built-in signal receiving component, the air conditioner to be switched from the working parameter of the rapid working mode to the working parameter of the user set mode for running.

8. The air conditioner control device of claim 7, wherein the processor is further configured to:
receive an enabling remote control signal sent by the smart socket through the built-in signal sending component, wherein the enabling remote control signal is configured to request to set the rapid working mode of the air conditioner into the enabled state; and
set the rapid working mode of the air conditioner into the enabled state according to the enabling remote control signal, and record a corresponding relationship between the identifier of the smart socket and the enabled state.

9. An air conditioner control device, comprising:
a processor; and
a memory configured to store an instruction executable by the processor,
wherein the processor is configured to:
when determining that an air conditioner is turned on, send, through a built-in signal sending component, a turning-on remote control signal to a server, wherein the turning-on remote control signal contains an identifier of a smart socket, the turning-on remote control signal is configured to trigger the server to query whether a rapid working mode of the air conditioner is in an enabled state or not according to a corresponding relationship between the identifier and a working state of the air conditioner, the rapid working mode is a turning-on rapid cooling mode or a turning-on rapid heating mode, wherein the corresponding relationship is pre-recorded in the server, and a plug of the air conditioner has been plugged into the smart socket;
receive, through a built-in signal receiving component, a first remote control signal sent by the server, wherein the first remote control signal is sent when the server finds that the rapid working mode of the air conditioner is in the enabled state;
control the air conditioner to run with a working parameter of the rapid working mode according to the first remote control signal;
receive, throuqh the built-in signal receiving component, a second remote control signal sent by the server when a timer reaches a preset time period threshold value, wherein the timer is started when the server determines that the rapid working mode of the air conditioner is in the enabled state; and
control, through the built-in signal sending component, the air conditioner to be switched from the working parameter of the rapid working mode to a working parameter of a user set mode for running according to the second remote control signal.

10. The air conditioner control device of claim 9, wherein the processor is further configured to:
when the turning-on remote control signal is to be sent through the built-in signal sending component, add the working parameter of the user set mode into the turning-on remote control signal for sending to the server through the built-in signal sending component; and
when a control signal sent by a control device is received through the built-in signal receiving component, instruct the built-in signal sending component to send the working parameter of the user set mode in the control signal to the server, wherein the control signal is configured to control the air conditioner to run with the working parameter of the user set mode.

11. The air conditioner control device of claim 9, wherein the processor is further configured to:
receive, through the built-in signal receiving component, an enabling signal sent by a control device; and
instruct the built-in signal sending component to send an enabling remote control signal to the server according to the enabling signal, wherein the enabling remote control signal is configured to request to set the rapid working mode of the air conditioner into the enabled state.

12. The air conditioner control device of claim 9, wherein the processor is further configured to:
when a turning-on signal sent by a control device is received through the built-in signal receiving component, determine that the air conditioner is turned on, and generate the turning-on remote control signal.

13. The air conditioner control device of claim 9, wherein the processor is further configured to:
when it is determined, through a power statistic meter, that power consumed by the air conditioner is higher than a turning-on threshold value, determine that the air conditioner is turned on, and generate the turning-on remote control signal.

* * * * *